(12) United States Patent
Matsushita

(10) Patent No.: US 11,630,564 B2
(45) Date of Patent: Apr. 18, 2023

(54) INFORMATION PROCESSING DEVICE AND PROGRAM

(71) Applicant: Faurecia Clarion Electronics Co., Ltd., Saitama (JP)

(72) Inventor: Yuki Matsushita, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 0 days.

(21) Appl. No.: 17/728,271

(22) Filed: Apr. 25, 2022

(65) Prior Publication Data

US 2022/0350474 A1   Nov. 3, 2022

(30) Foreign Application Priority Data

Apr. 28, 2021  (JP) ............................. JP2021-076669

(51) Int. Cl.
| | |
|---|---|
| *G06F 3/048* | (2013.01) |
| *G06F 3/04847* | (2022.01) |
| *G06F 3/04883* | (2022.01) |
| *G06F 3/14* | (2006.01) |
| *G06F 3/041* | (2006.01) |

(52) U.S. Cl.
CPC .......... *G06F 3/04847* (2013.01); *G06F 3/041* (2013.01); *G06F 3/04883* (2013.01); *G06F 3/14* (2013.01)

(58) Field of Classification Search
None
See application file for complete search history.

(56) References Cited

U.S. PATENT DOCUMENTS

| | | | |
|---|---|---|---|
| 7,720,552 B1* | 5/2010 | Lloyd | G06F 3/04847 345/184 |
| 9,367,235 B2* | 6/2016 | Westerman | G06F 3/041 |
| 2007/0152984 A1* | 7/2007 | Ording | G06F 3/04883 345/173 |
| 2014/0002339 A1* | 1/2014 | Guard | G06F 3/04847 345/156 |
| 2019/0012073 A1* | 1/2019 | Hwang | G06F 3/0488 |

FOREIGN PATENT DOCUMENTS

JP   2012-150849 A   8/2012

* cited by examiner

*Primary Examiner* — Tuan S Nguyen
(74) *Attorney, Agent, or Firm* — IP Business Solutions, LLC

(57) ABSTRACT

The information processing device includes: an operation detecting unit that determines that a first touch operation has been detected, calculates the length of a virtual line segment connecting the plurality of touched positions detected or the rotation angle with respect to a reference direction for the virtual line segment, and determines whether or not there has been a change in the length or rotation angle of a virtual line segment when coordinate information has been inputted, the touch panel displaying a second screen, and determines that a second touch operation has been detected when it has been determined that there has been a change in the length or rotation angle of the virtual line segment; and an execution instruction issuing unit that issues an instruction to execute the process associated with the change in the length of the virtual line segment or the rotation direction of the virtual line segment.

3 Claims, 8 Drawing Sheets

INFORMATION PROCESSING DEVICE AND PROGRAM

CROSS-REFERENCE TO RELATED APPLICATIONS

The present application claims priority under 35 U.S.C. § 119 to Japanese Patent Application No. 2021-076669 filed on Apr. 28, 2021. The content of the application is incorporated herein by reference in its entirety.

BACKGROUND OF THE INVENTION

Field of the Invention

The present invention relates to an information processing device and program.

Description of the Related Art

Some known information processing devices are provided with a touch panel to serve as a receiving unit for receiving user input. Japanese Patent Application Publication No. 2012-150849 discloses an input device for a portable electronic device including a touch panel with an input function based on touching an input surface, a display unit on which the input surface of the touch panel has been placed that can visibly display information related to input operations, and an input control unit that issues a processing instruction for inputted signals based on signals inputted using the touch panel. By displaying buttons as visible information related to input operations on the display unit, this input device enables the touch panel to be operated while viewing visible information in the form of buttons on the touch panel.

However, in order to enter a plurality of commands using touch panel operations, the user has to remember which operations performed using the touch panel are associated with which commands inputted by those operations. Therefore, there is room for improvement from the standpoint of greater convenience.

SUMMARY OF THE INVENTION

In view of this situation, it is an object of the present invention to provide an information processing device and program that improves the operability of operations performed using a touch panel and that improves user convenience.

In order to achieve this object the present invention is an information processing device comprising: an operation detecting unit that detects a first touch operation and a second touch operation different from the first touch operation on a touch panel based on coordinate information indicating a touched position inputted from the touch panel; a display control unit that displays a first screen on the touch panel and that changes the display on the touch panel from the first screen to a second screen when a first touch operation has been detected by the operation detecting unit; and an execution instruction issuing unit that issues an instruction to execute a process associated with the detected second touch operation when a second touch operation has been detected by the operation detecting unit on the touch panel displaying the second screen, the operation detecting unit determining that a first touch operation has been detected when a plurality of touched positions have been detected based on the coordinate information, calculating the length of a virtual line segment connecting the plurality of touched positions detected as the first touch operation or the rotation angle of the virtual line segment with respect to a reference direction, determining whether or not there has been a change in the length or the rotation angle of the virtual line segment based on inputted coordinate information when coordinate information has been inputted from the touch panel on the touch panel displaying the second screen, and determining that a second touch operation has been detected when it has been determined that a change in the length or the rotation angle of the virtual line segment has occurred, and the execution instruction issuing unit issuing an instruction to execute a process associated with the change in the length of the virtual line segment or the rotation direction of the virtual line segment.

Effect of the Invention

The present invention is able to improve the operability of operations performed using a touch panel and improve user convenience.

DETAILED DESCRIPTION OF THE INVENTION

Figure 1:
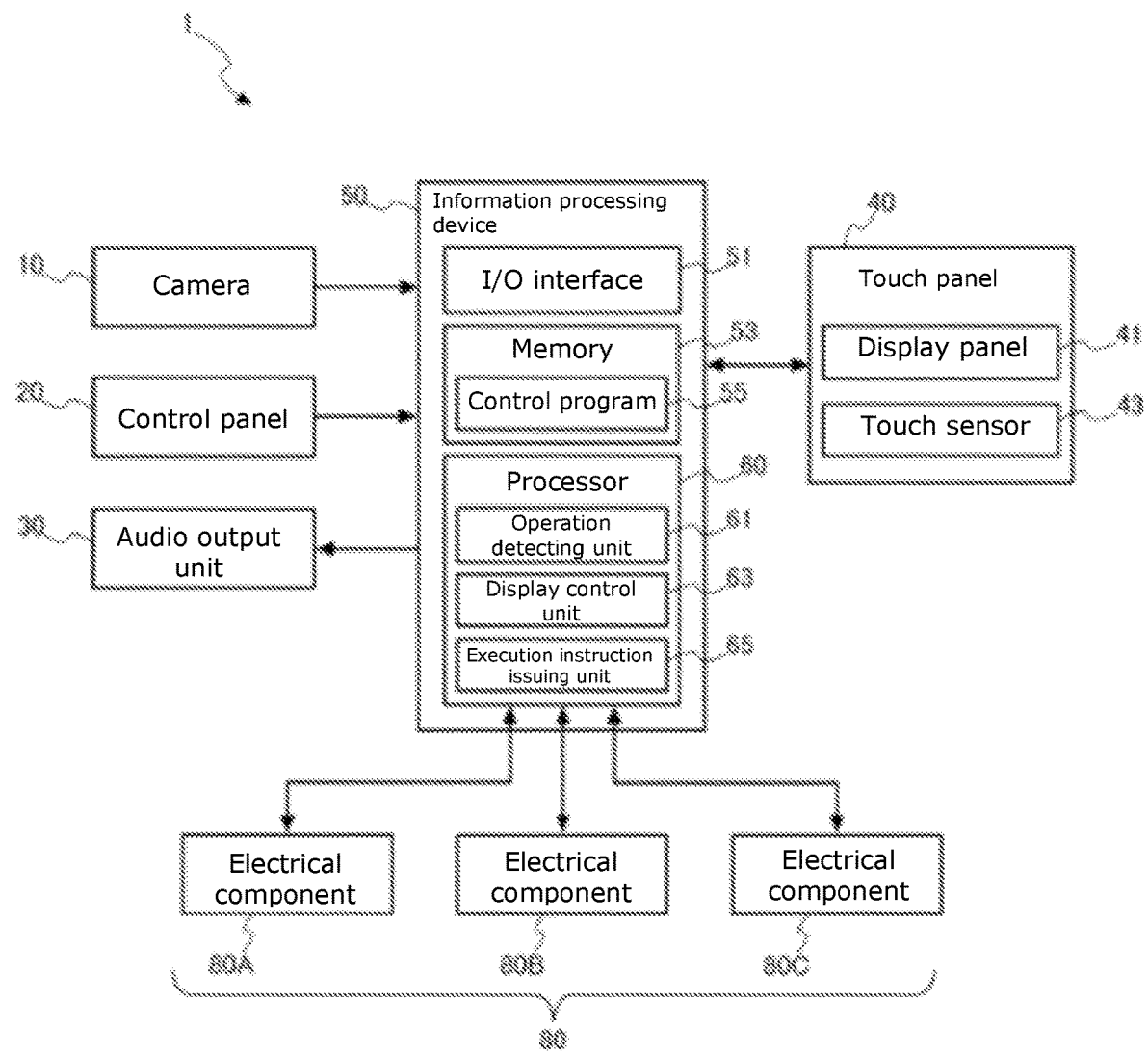
FIG. 1 is a block diagram showing the configuration of the information processing device.

An embodiment of the present invention will now be described with reference to the appended drawings. FIG. 1 is a diagram showing the configuration of the information processing device in the present embodiment. The system 1 shown in FIG. 1 is a system installed in a vehicle equipped with a plurality of electrical components 80. An operation performed by a passenger in the vehicle is received to change the settings of the electrical component 80 corresponding to the received operation based on the received operation. These electrical components 80 are controlled devices. In the present embodiment, the vehicle is a vehicle with the steering wheel on the right.

The system 1 includes a camera 10, a control panel 20, an audio output unit 30, a touch panel 40, and an information processing device 50. The information processing device 50 includes an input/output interface 51, and is connected to electrical components 80 installed in the vehicle via the input/output interface 51. FIG. 1 includes electrical component 80A, electrical component 80B, and electrical component 80C as the electrical components 80. The number of electrical components installed in the vehicle and operated by the information processing device 50 is not limited to three, namely, electrical component 80A, electrical component 80B, and electrical component 80C. In the following description, interface is abbreviated as I/F. Electrical component 80A, electrical component 80B, and electrical component 80C are referred to collectively as the electrical components 80. The information processing device 50 and the electrical components 80 are connected via cables compatible with communication standards such as CAN (Controller Area Network) and Ethernet (registered trademark), and the input/output interface 51 includes a processing circuit and a connector compatible with standards such as CAN and Ethernet.

The camera 10 is mounted in the passenger compartment of the vehicle and captures images of vehicle passengers. The camera 10 is installed at either the left or right side of the windshield or the A-pillar, and captures images of the driver seated in the driver's seat and any passenger seated in the passenger seat. The camera 10 includes an image sensor such as a CCD (charge-coupled device) or CMOS (complementary metal-oxide-semiconductor), and a data processing circuit for generating images from light received by the image sensor. The camera 10 outputs captured images to the information processing device 50.

The control panel 20 functions as a receiving unit that receives operations performed by a passenger. The control panel 20 includes, for example, hardware buttons and switches.

The audio output unit 30 includes a digital-to-analog converter (DAC), an amplifier, and a loudspeaker, and functions as a notification unit that performs notification operations. The DAC, the amplifier and the loudspeaker are not shown. The audio output unit 30 converts digital audio signals inputted from the information processing device 50 into analog signals, amplifies the converted analog signals using the amplifier, and outputs the converted analog signals from the loudspeaker.

The touch panel 40 includes a display panel 41 such as a liquid crystal panel or an organic EL (electro-luminescence) panel, and a touch sensor 43. The touch sensor 43 detects a touch operation performed on the touch panel 40 by a passenger. The touch sensor 43 detects the touched position where the passenger's finger touched the display panel 41, and outputs coordinate information indicating the touched position to the information processing device 50. A coordinate system is established in advance on the display panel 41, and the touch sensor 43 outputs coordinate information indicating the position where the passenger's finger is touching the display panel 41 to the information processing device 50. In the present embodiment, the controller used to operate the touch panel is a passenger finger. However, the controller may also be an indicator such as a pointer.

The information processing device 50 is a computer device including an input/output I/F 51, a memory 53, and a processor 60. The information processing device 50 controls the operations performed by the information processing device 50 in an integrated manner by operating a processor 60 in accordance with a control program 55 stored in the memory 53.

The memory 53 includes semiconductor memory such as RAM (random-access memory) and ROM (read-only memory). The RAM is used to temporarily store different types of data, and the ROM is used to store the control program 55 for controlling the operations performed by the information processing device 50 as well as various settings.

The processor 60 is an arithmetic processing unit composed of a CPU (central processing unit) and an MPU (microprocessing unit). The processor 60 executes the control program 55 to control each component in the information processing device 50. The processor 60 may be configured from a single processor or may be configured using a plurality of processors. The processor 60 may also be configured using some or all of the memory 53 or an SoC (system-on-a-chip) integrated with other circuits. The processor 60 may also be configured from a combination of a CPU that executes a program and a DSP that executes a predetermined arithmetic process. All of the functions of the processor 60 may be implemented using hardware or may be configured using a programmable device.

The information processing device 50 includes an operation detecting unit 61, a display control unit 63, and an execution instruction issuing unit 65 as functional configurations. These functional configurations are functions realized by the processor 60 performing an operation in accordance with the control program 55.

The operation detecting unit 61 detects a touch operation based on coordinate information inputted from the touch panel 40. The operation detecting unit 61 includes a first touch operation and a second touch operation.

A first touch operation is an operation in which the passenger brings two fingers into contact with the touch panel 40. The operation detecting unit 61 determines that a first touch operation has been detected when coordinate information for two points has been inputted from the touch panel 40.

A second touch operation is an operation in which the two fingers brought into contact with the touch panel 40 in the first touch operation are rotated around the center of rotation while remaining in contact with the touch panel 40 and while keeping the distance between the two fingers constant, or widening or narrowing the space between the two fingers. The operation detecting unit 61 establishes a virtual line segment connecting the two points indicated by the coordinate information for the two points detected as the first touch operation. The operation detecting unit 61 then determines that a second touch operation has been detected based on the coordinate information of the two points that has been inputted from the touch panel 40 when the length of the virtual line segment has changed or the virtual line segment has been rotated.

The display control unit 63 generates image data and causes the touch panel 40 to display a menu screen which is an image based on the generated image data. The menu screens displayed on the touch panel 40 by the information processing device 50 includes a first menu screen 100 and a second menu screen 200. The first menu screen 100 corresponds to the first screen, and the second menu screen 200 corresponds to the second screen.

The execution instruction issuing unit 65 instructs the targeted electrical component 80 to execute the process corresponding to the second touch operation detected by the operation detecting unit 61.

Figure 2:
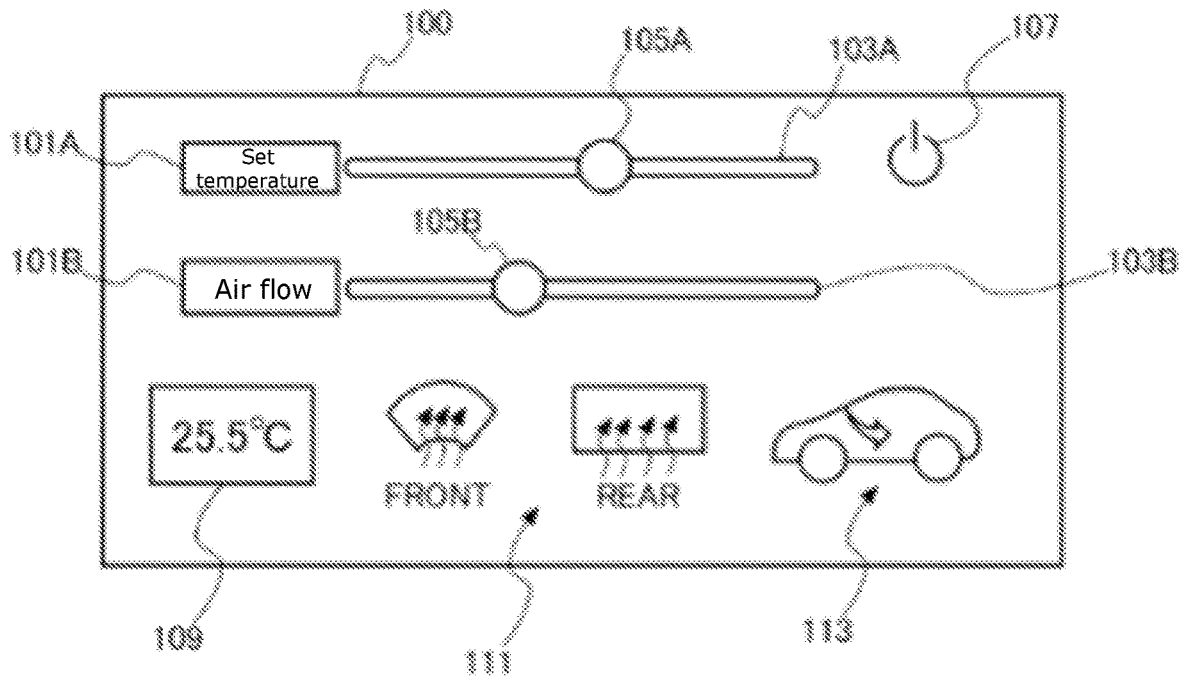
FIG. 2 is a diagram showing an example of the first menu screen.

FIG. 2 is a diagram showing an example of the first menu screen 100. The display control unit 63 causes the touch panel 40 to display the first menu screen 100 when the driver turns the ignition key and the vehicle accessory power is turned on. Because the first menu screen 100 is the screen that is first displayed on the touch panel 40 after the accessory power has been turned on, it is also referred to as the initial screen.

The first menu screen 100 is actually a plurality of screens for each electrical component 80 whose settings can be changed by operating the first menu screen 100. For example, the first menu screen 100 can have a first menu screen 100 for changing the settings of the air conditioner, a first menu screen 100 for changing the setting of the audio equipment, and a first menu screen 100 for changing the settings of the navigation device. Other electrical components 80 whose settings can be changed by operating the first menu screen 100 include electric seats and the touch panel 40 itself. The traveling mode of the vehicle may also be changed by the first menu screen 100. Traveling modes include an eco mode that emphasizes low fuel consumption, a sports mode that emphasizes acceleration, and a normal mode between eco mode and sports mode. Display of the first menu screen 100, that is, the electrical component 80 whose settings can be changed by operating the first menu screen 100 can be changed by operating a switch or button on the control panel 20.

FIG. 2 is a diagram showing a first menu screen 100 for changing the settings of the air conditioner. The first menu screen 100 for operating the settings of the air conditioner can include a display for changing the air flow outputted from the air conditioner and a display for changing the temperature setting of the air conditioner. The first menu screen 100 for changing the settings of the air conditioner can include a button for switching power to the air conditioner ON and OFF 107, display 109 of the set temperature for the air conditioner, display 111 of air outlets that are open from the air conditioner, and a button 113 to switch between circulating cabin air and introducing outside air. The first menu screen 100 for operating the settings of the audio equipment can display a music selection button, a volume adjustment button, and a radio channel selection button.

Operations and the controllers used to perform the operations can also be displayed on the first menu screen 100. Controllers include buttons, switches, slider bars, and sliders. The first menu screen 100 for changing the settings of the air conditioner shown in FIG. 2 can display the set temperature 101A for the air conditioner and the air flow 101B. A slider bar 103A and a slider 105A are displayed as the controllers for changing the set temperature 101A, and a slider bar 103B and a slider 105B are displayed as the controllers for changing the air flow 101B.

Figure 3:
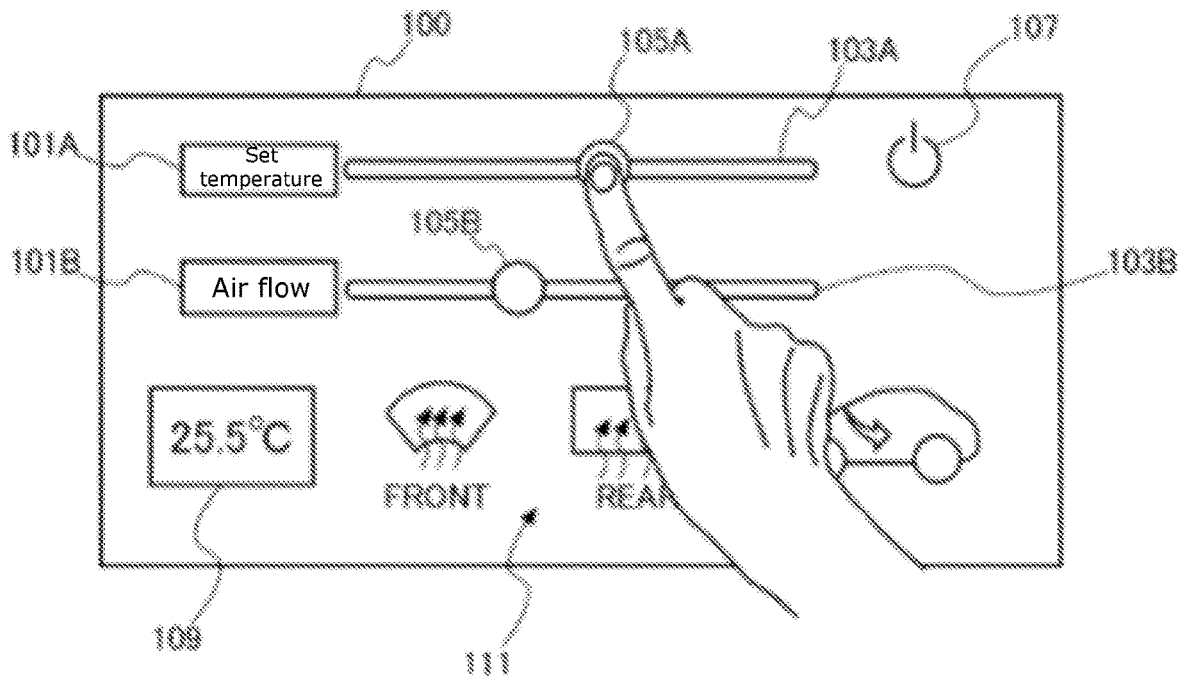
FIG. 3 is a diagram showing the method used to manipulate the first menu screen using touch operations.

FIG. 3 is a diagram showing the method used to operate the first menu screen 100 using touch operations. When a passenger changes the settings for an operation on the first menu screen 100, the passenger places one finger on the display position of the slider 105A, 105B of the setting the passenger wishes to change, and moves the touching finger left or right along the slider bar 103A, 103B. The display control unit 63 changes the display position of the slider 105A, 105B to the coordinates indicated by the coordinate information inputted from the touch panel 40. When the execution instruction issuing unit 65 has detected that the finger touching the touch panel 40 has left the touch panel 40, it outputs set temperature and air flow setting change instructions to the air conditioner based on the position on the slider 105A, 105B where the finger was released.

Figure 4:
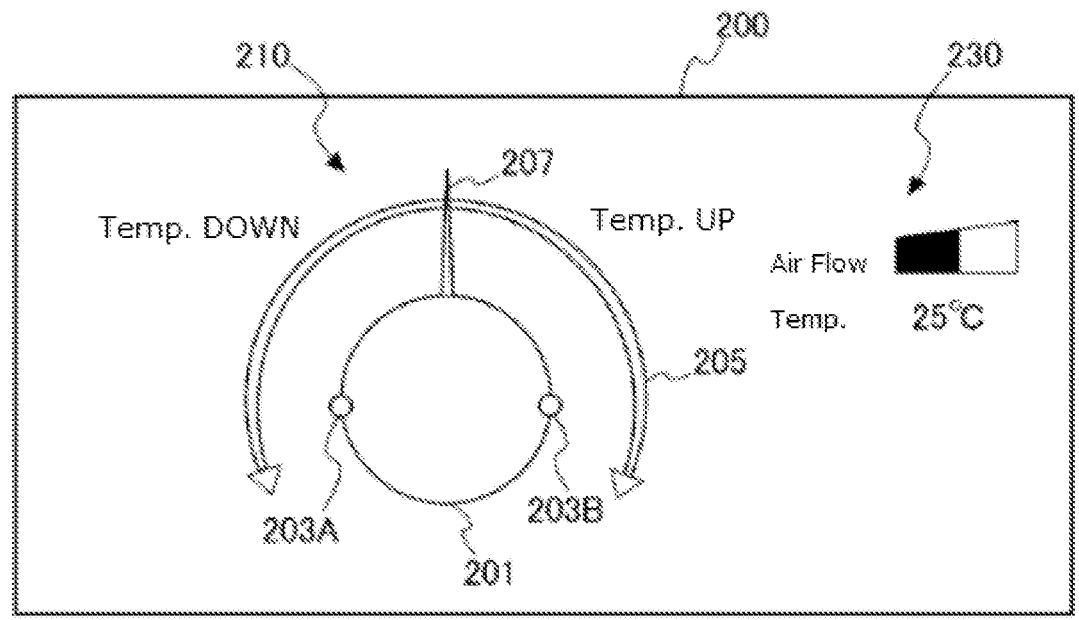
FIG. 4 is a diagram showing an example of the second menu screen.
Figure 5:
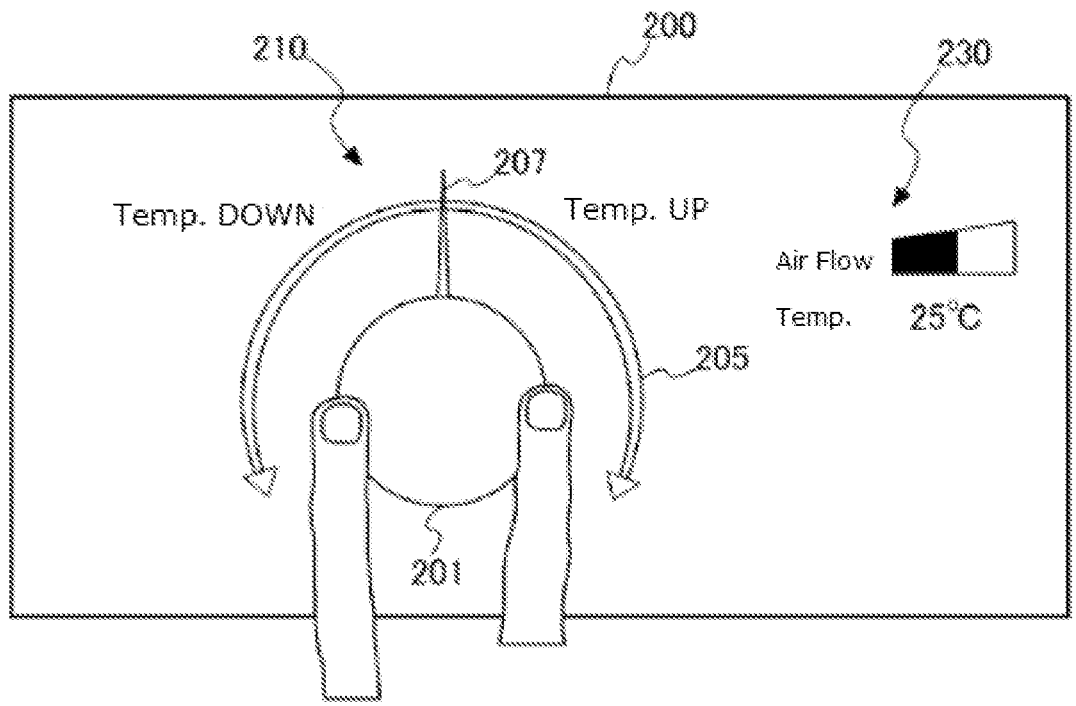
FIG. 5 is a diagram showing the touch panel touched by a passenger using two fingers.

FIG. 4 is a diagram showing an example of the second menu screen 200, and FIG. 5 is a diagram showing the touch panel 40 touched by a passenger using two fingers. When a first touch operation is detected, the display control unit 63 changes the display of the touch panel 40 from the first menu screen 100 to the second menu screen 200. The second menu screen 200 is the screen used to change the settings of an electrical component 80. In the present embodiment, the second menu screen 200 is a control screen for changing the settings of the same electrical component 80 as the one on first menu screen 100 displayed before the second menu screen 200. For example, when the first menu screen 100 is a screen for changing the settings of an air conditioner, the second menu screen 200 also displays a screen for changing the settings of the air conditioner. Moreover, the second menu screen 200 may always be a control screen for changing the preset settings of an electrical component 80, regardless of the first menu screen 100.

A control image 210 and associated information 230 are displayed on the second menu screen 200. The control image 210 includes a circle graphic 201, contact points 203A, 203B, a range graphic 205, and a pointer 207. The associated information 230 includes control items for the electrical component 80 whose settings are changed by operating the control image 210, as well as the current settings for these control items. For example, when the electrical component 80 is an air conditioner, the air flow and temperature settings for the air conditions are displayed as associated information 230.

The contact points 203A, 203B are graphics indicating the positions where fingers were brought into contact with the touch panel 40 in a first touch operation performed by a passenger. The contact points 203A, 203B are displayed at the contact positions on the touch panel 40 touched by the passenger using the two fingers.

The circle graphic 201 is a circle graphic whose diameter is a line segment connecting contact point 203A and contact point 203B. The circle graphic 201 is always displayed as a circle graphic with the diameter of the line segment connecting contact point 203A and contact point 203B, which are the contact positions of the two fingers, even when the passenger's two fingers brought into contact with the touch panel 40 move on the touch panel 40.

The range graphic 205 is a graphic showing a setting range corresponding to the control item for the electrical component 80 controlled using the control image 210. The range graphic 205 is displayed above the circle graphic 201 at a position separated from the circle graphic 201 by a certain distance. The range of the range graphic 205 on the right side of the second menu screen 200 indicates the "temperature up" range, and the range of the range graphic 205 on the left side of the second menu screen 200 indicates the "temperature down" range. One end of the pointer 207 touches the circle graphic 201. When the circle graphic 201 is rotated by the passenger, the pointer 207 also rotates with the circle graphic 201. The position on the range graphic 205 pointed to by the pointer 207 is also changed by rotating the pointer 207. When a second touch operation has been accepted, the pointer 207 indicates the amount accepted in the second touch operation based on the position of the range graphic 205 pointed to by the pointer 207.

When the second menu screen 200 is displayed on the touch panel 40, the passenger performs a second touch operation while keeping the two fingers on the touch panel 40. The second touch operation can be an operation such as rotating the two fingers around the center of rotation while keeping the distance between the two fingers constant, increasing the space between the two fingers, or narrowing the space between the fingers.

Figure 6:
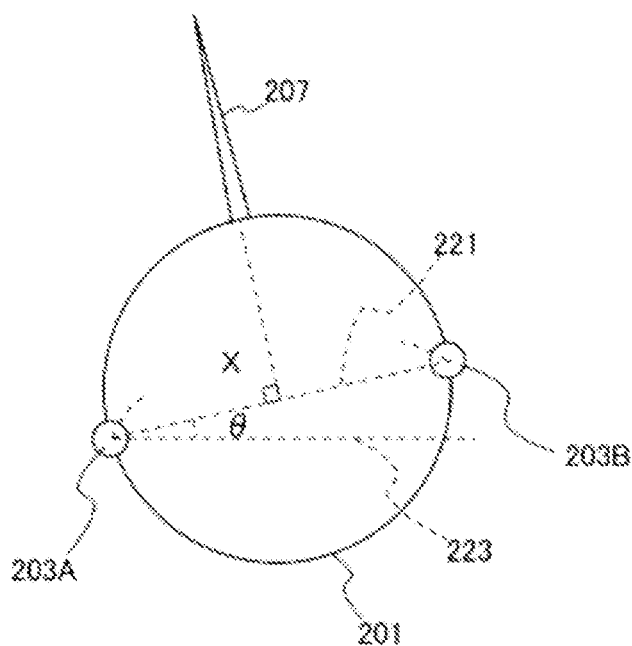
FIG. 6 is a diagram showing the positional relationship between the circle graphic and the pointer.

FIG. 6 is a diagram showing a virtual line segment 221 and the angle θ formed on the touch panel 40 by the virtual line segment 221 and the horizontal direction. In the present embodiment, angle θ is an angle that is negative when rotated to the right and positive when rotated to the left. Also, line segment 223 in FIG. 6 is a line segment indicating the horizontal direction on the touch panel 40. First, the operation detecting unit 61 establishes a virtual line segment 221 connecting the two points indicated by the coordinate information detected as a first touch operation. The operation detecting unit 61 calculates the length X of the virtual line segment 221 and the rotation angle θ of the line segment on the touch panel 40 with respect to the direction. The length X of the virtual line segment 221 calculated from coordinate information in a first touch operation is referred to as the first length X1, and the rotation angle θ of the virtual line segment 221 calculated from coordinate information in a first touch operation is referred to as the first rotation angle θ1. Next, when the passenger performs a second touch operation and new coordinate information is inputted from the touch panel 40, the operation detecting unit 61 calculates the new length X and rotation angle θ of the virtual line segment 221 based on the coordinate information of the two inputted points. The length X of the new virtual line segment 221 calculated from coordinate information in a second touch operation is referred to as the second length X2, and the new rotation angle θ of the virtual line segment 221 calculated from coordinate information in a second touch operation is referred to as the second rotation angle θ2. The operation detecting unit 61 compares the first length X1 and the first rotation angle θ1 with the second length X2 and the second rotation angle θ2, and determines whether or not a second touch operation has been detected.

When the second length X2 of the virtual line segment 221 is longer than the first length X1, the operation detecting unit 61 determines that an operation widening the space between the two fingers has been detected as the second touch operation. In this case, the operation detecting unit 61 determines the difference between the second length X2 and the first length X1, and outputs the resulting difference to the execution instruction issuing unit 65. When the second length X2 of the virtual line segment 221 is shorter than the first length X1, the operation detecting unit 61 determines that an operation narrowing the space between the two fingers has been detected as the second touch operation. In this case, the operation detecting unit 61 also determines the difference between the second length X2 and the first length X1, and outputs the resulting difference to the execution instruction issuing unit 65.

Also, when the second rotation angle θ2 of the virtual line segment 221 is larger than the first rotation angle θ1, the operation detecting unit 61 determines that counterclockwise rotation of the two fingers has been detected as the second touch operation. In this case, the operation detecting unit 61 determines the difference between the second rotation angle θ2 and the first rotation angle θ1, and outputs the resulting difference to the display control unit 63 and the execution instruction issuing unit 65. When the second rotation angle θ2 of the virtual line segment 221 is smaller than the first rotation angle θ1, the operation detecting unit 61 determines that clockwise rotation of the two fingers has been detected as the second touch operation. In this case, the operation detecting unit 61 determines the difference between the second rotation angle θ2 and the first rotation angle θ1, and outputs the resulting difference to the display control unit 63 and the execution instruction issuing unit 65.

Figure 7:
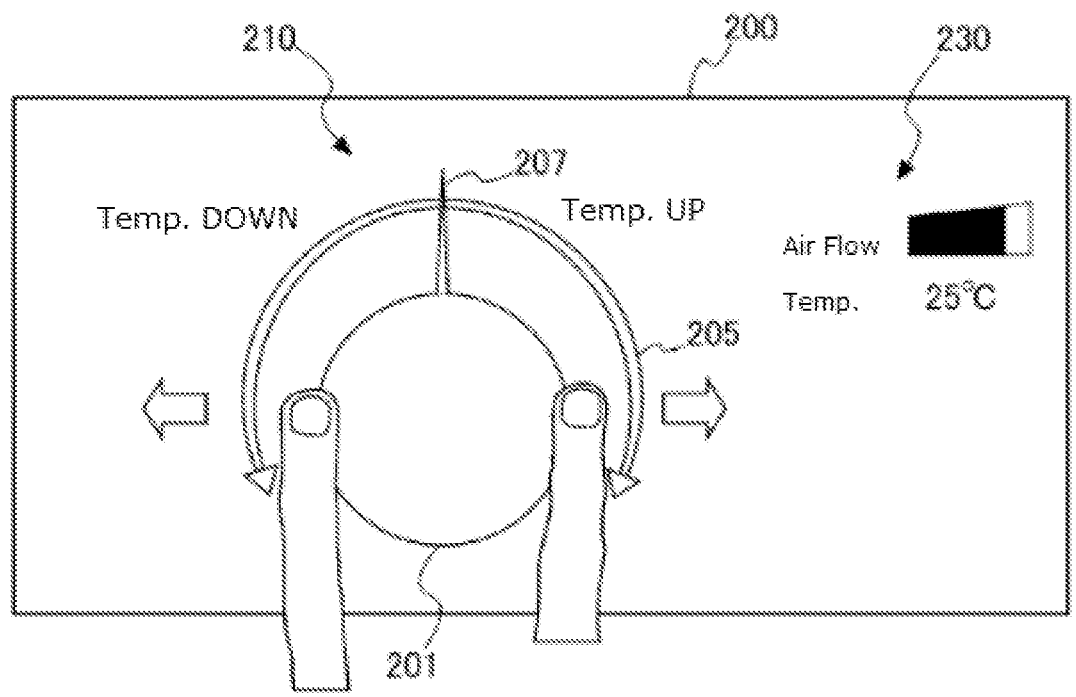
FIG. 7 is a diagram showing a situation in which the space between the two fingers has been widened.
Figure 8:
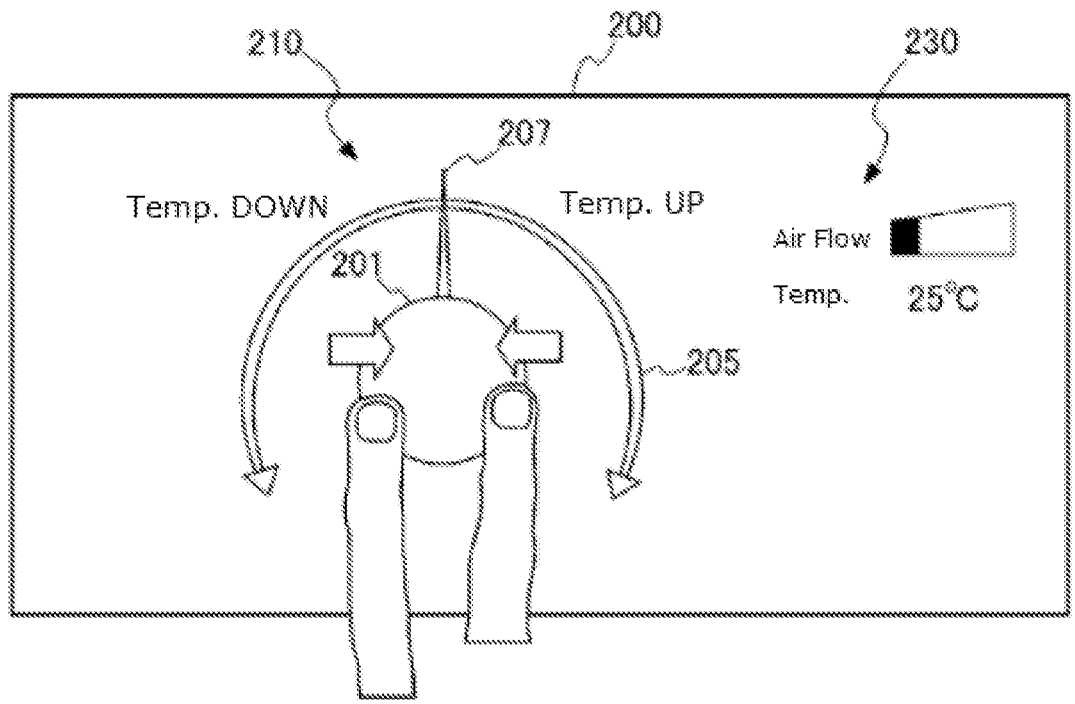
FIG. 8 is a diagram showing a situation in which the space between the two fingers has been narrowed.

FIG. 7 is a diagram showing a situation in which the space between the two fingers in contact with the touch panel 40 has been widened, and FIG. 8 is a diagram showing a situation in which the space between the two fingers in contact with the touch panel 40 has been narrowed. The display control unit 63 changes the display positions of the contact points 203A, 203B based on the coordinate information detected as the second touch operation. When the passenger widens the space between the two fingers, the diameter of the circle graphic 201 is also changed based on the wider distance between the two fingers as shown in FIG. 7. When the passenger narrows the space between the two fingers, the diameter of the circle graphic 201 is also changed based on the narrower distance between the two fingers as shown in FIG. 8.

In the present embodiment, an operation that widens the space between two fingers is associated with an operation that increases the air flow of the air conditioner, and an operation that narrows the space between two fingers is associated with an operation that decreases the air flow of the air conditioner. When information indicating the difference between the second length X2 and the first length X1 has been inputted from the operating detecting unit 61, the execution instruction issuing unit 65 calculates the ratio of the inputted difference to a preset reference value. The reference value is a value used to associate the difference between the second length X2 and the first length X1 with the amount of increase or decrease in the air flow from the air conditioner. The execution instruction issuing unit 65 calculates the increased or decreased air flow from the air conditioner based on the ratio of the inputted difference to the reference value. The execution instruction issuing unit 65 instructs the air conditioner to change the air flow to the calculated air flow.

Figure 9:
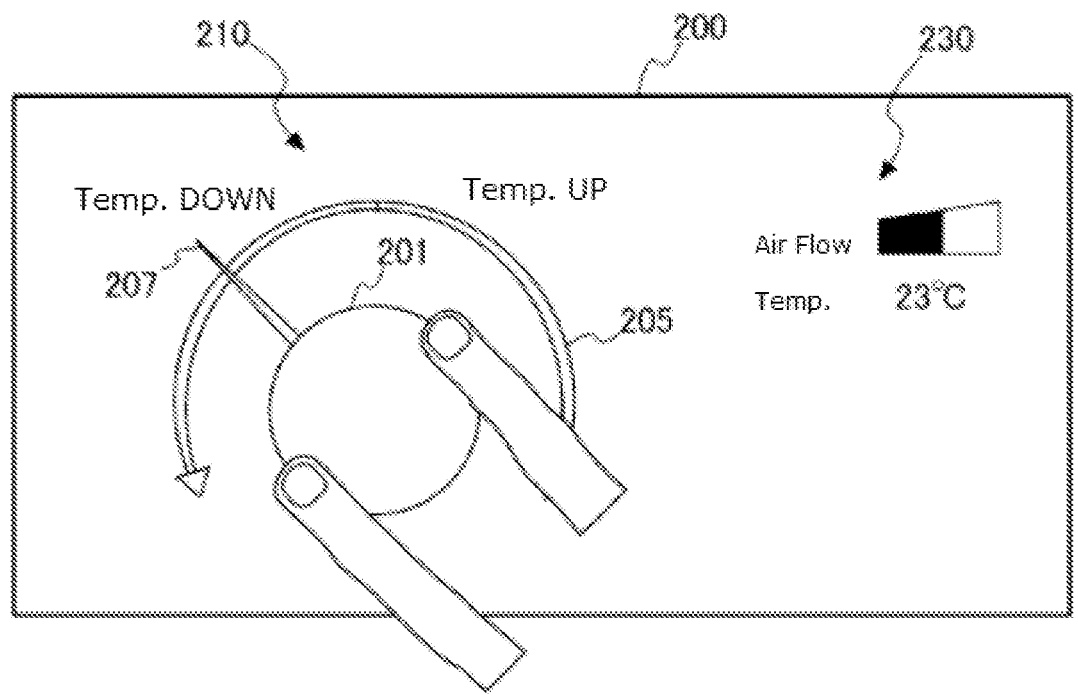
FIG. 9 is a diagram showing a situation in which the pointer has been rotated to the left.
Figure 10:
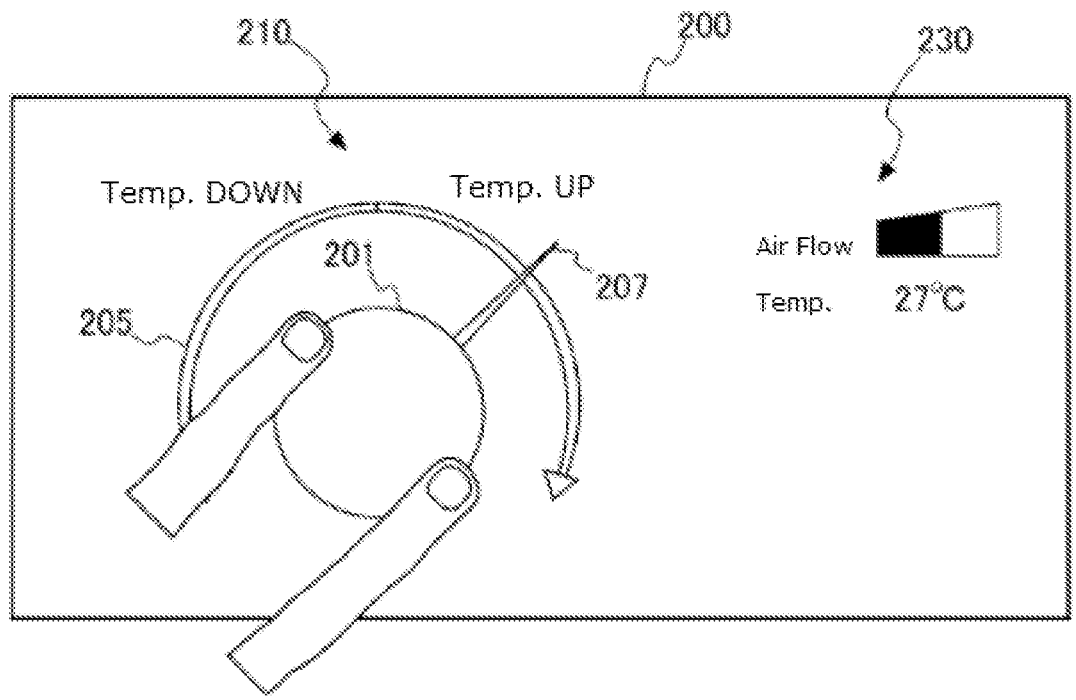
FIG. 10 is a diagram showing a situation in which the pointer has been rotated to the right.

FIG. 9 is a diagram showing a situation in which the pointer 207 has been rotated to the left from the vantage point of the passenger, and FIG. 10 is a diagram showing a situation in which the pointer has been rotated to the right from the vantage point of the passenger. In the present embodiment, an operation in which the two fingers are rotated counterclockwise around the center of rotation while keeping the distance between the two fingers constant corresponds to the operation for lowering the temperature setting of the air conditioner. Also, an operation in which the two fingers are rotated clockwise around the center of rotation while keeping the distance between the two fingers constant corresponds to the operation for raising the temperature setting of the air conditioner.

When the difference between the second rotation angle θ2 and the first rotation angle θ1 is inputted from the operation detecting unit 61, the display control unit 63 changes the display position of the pointer 207 with respect to the range graphic 205 based on the inputted difference. When the second menu screen 200 is displayed on the touch panel 40, the pointer 207 is displayed in the center of the range graphic 205. The display control unit 63 then changes the display position of the pointer 207 with respect to the range FIG. 205 based on the difference between the second rotation angle θ2 and the first rotation angle θ1. When the difference between the second rotation angle θ2 and the first rotation angle θ1 is a positive value, the display control unit 63 rotates the display position of the pointer 207 to the left based on the difference as shown in FIG. 9. When the difference between the second rotation angle θ2 and the first rotation angle θ1 is a negative value, the display control unit 63 rotates the display position of the pointer 207 to the right based on the difference as shown in FIG. 10.

When information indicating the difference between the second rotation angle θ2 and the first rotation angle θ1 is inputted from the operation detecting unit 61, the execution instruction issuing unit 65 calculates the ratio between the inputted difference and a preset reference value. The reference value is a value used to associate the difference between the second rotation angle θ2 and the first rotation angle θ1 with the amount of increase or decrease in the temperature setting from the air conditioner. The execution instruction issuing unit 65 calculates the increased or decreased temperature from the air conditioner based on the ratio of the inputted difference to the reference value. The execution instruction issuing unit 65 instructs the air conditioner to change the temperature setting to the calculated temperature setting.

Figure 11:
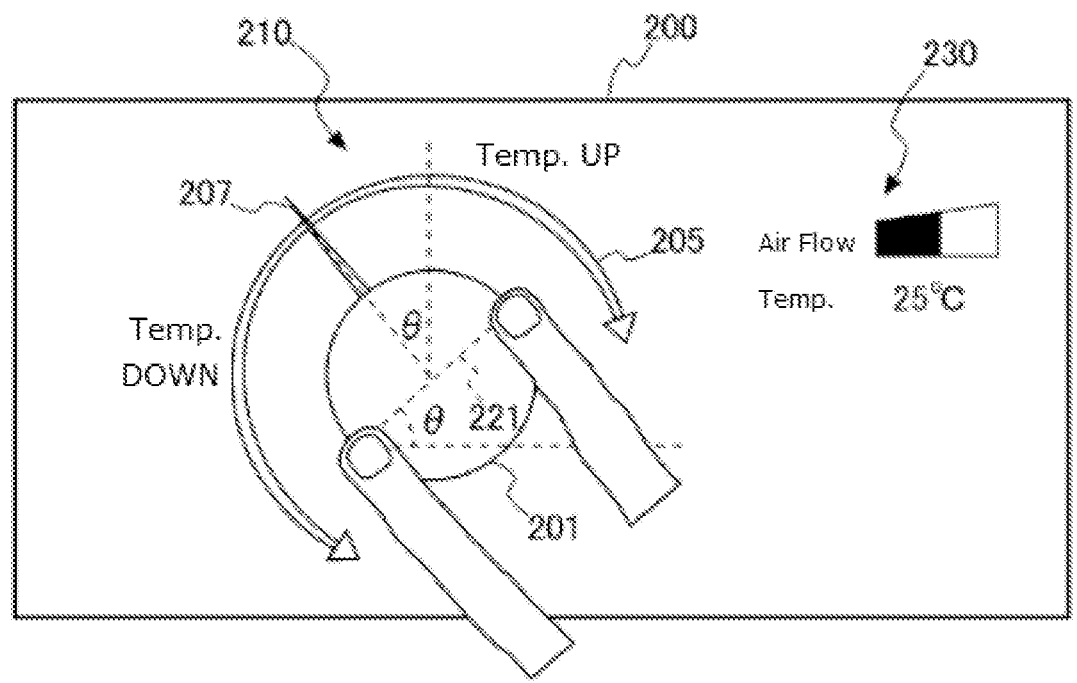
FIG. 11 is a diagram showing a situation in which the two fingers are touching the screen obliquely rather than parallel to the horizontal direction of the touch panel.

FIG. 11 is a diagram showing a situation in which the two fingers in the first touch operation are touching the screen obliquely rather than parallel to the horizontal direction of the touch panel 40. For example, when the touch panel 40 is located in the center of the vehicle in the width direction at a location away from the driver in the driver's seat, the virtual line segment 221 connecting the two touched fingers may be tilted with respect to the horizontal direction of the touch panel 40 as shown in FIG. 11. FIG. 11 shows a situation in which the virtual line segment 221 connecting the two touched fingers is tilted by angle θ with respect to the horizontal direction of the touch panel 40. In this case, the display control unit 63 displays the pointer 207 tilted by an angle θ with respect to the vertical direction of the touch panel 40. As a result, the air flow and temperature setting can be changed in response to subsequent movement of the two fingers, with the initial state serving as the state in which the passenger first touched the touch panel 40 with two fingers.

Associated information 230 is also displayed on the second menu screen 200. For example, when the control target of a control image 210 is an air conditioner, information such as the set temperature and the air flow is displayed as associated information 230. The display position of the associated information 230 is preferably a position that does not overlap with the control image 210 and that is easily visible to the passenger operating the control image 210.

For example, the regions of the touch panel 40 seen from the passenger may be divided into three regions, a left region, a right region, and a central region, and the passenger may touch the left region of the touch panel 40 with two fingers. At this time, the control image 210 is displayed in the left region centered on the coordinates where contact with two fingers was detected, and the associated information 230 is displayed in the right region. When the passenger touches the right region of the touch panel 40 with two fingers, the control image 210 is displayed in the right region centered on the coordinates where contact with two fingers was detected, and the associated information 230 is displayed in the left region.

When displaying associated information 230, the information processing device 50 analyzes images captured by the camera 10 and operates the touch panel 40 based on whether a passenger sitting in the passenger seat or the driver sitting in the driver's seat is operating the device. When it has been determined that the passenger in the passenger seat is operating the touch panel 40 and the central area of the touch panel 40 is touched, the information processing device 50 displays the associated information 230 in the right area of the touch panel 40 on the driver side. When it has been determined that the driver in the driver's seat is operating the touch panel 40 and the central area of the touch panel 40 is touched, the information processing device 50 displays the associated information 230 in the left area of the touch panel 40 on the passenger side. This keeps the information displayed on the touch panel 40 from being concealed by a hand during operation. When the central area of the touch panel 40 is divided into two parts, an upper part and a lower part, and coordinates in the upper central area of the touch panel 40 are detected as the coordinates indicating the touched position, the associated information 230 may be displayed in the lower central area. When coordinates in the lower central area of the touch panel 40 are detected as the coordinates indicating the touched position, the associated information 230 may be displayed in the upper central area.

Figure 12:
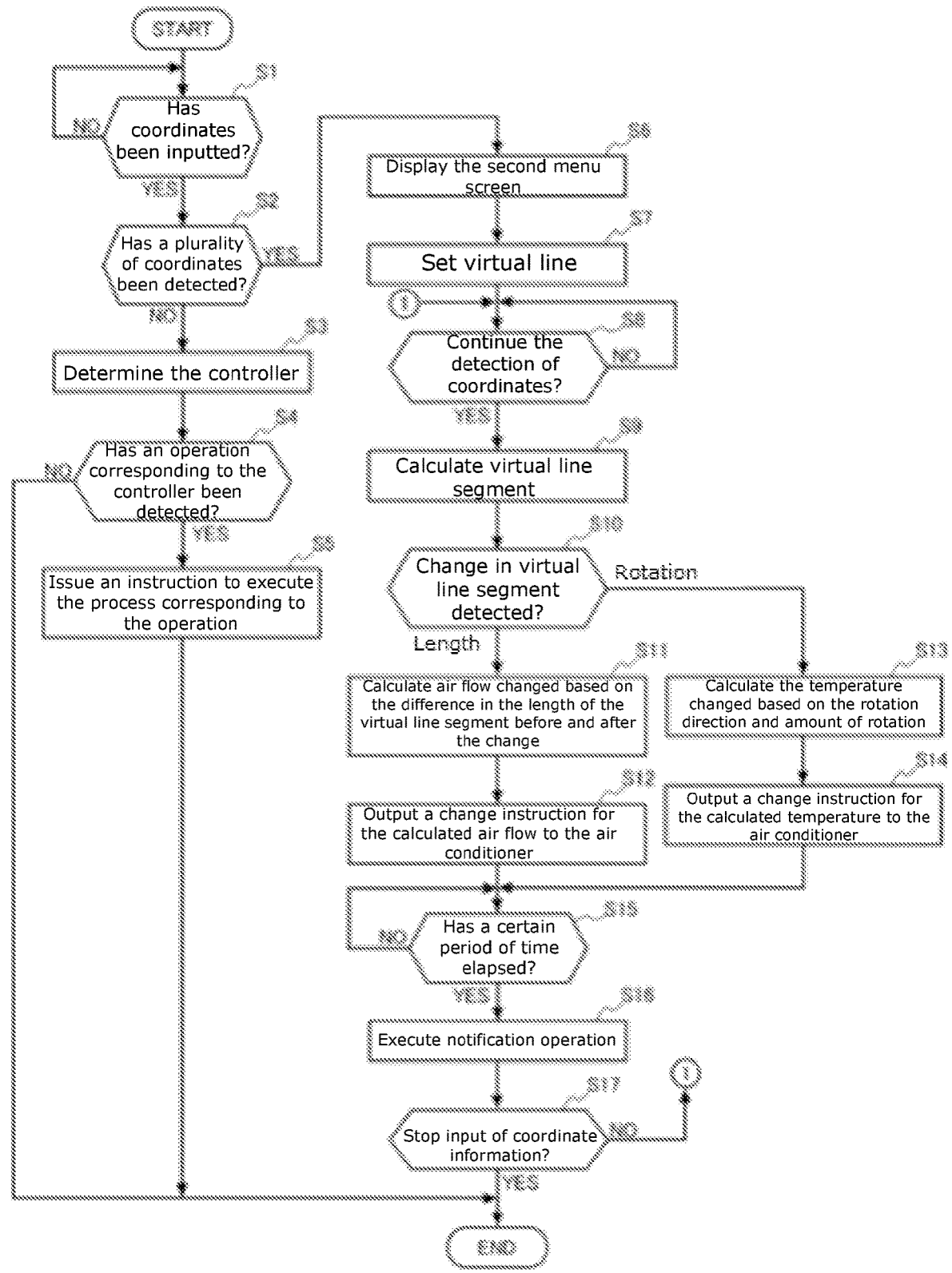
FIG. 12 is a flowchart showing operations performed by the information processing device.

FIG. 12 is a flowchart showing operations performed by the information processing device 50. The operations performed by the information processing device 50 will be explained with reference to the flowchart in FIG. 12. First, the information processing device 50 determines whether or not coordinate information from a touch operation has been inputted (step S1). When coordinate information from a touch operation has not been inputted (step S1/NO), the information processing device 50 does not advance to the next step until coordinate information from a touch operation has been inputted. Step S1 corresponds to the detection step in the claims.

When coordinate information for a touch operation has been inputted from the touch panel 40 (step S1/YES), the information processing device 50 determines whether or not more than one set of coordinate information indicating a touch operation has been inputted (step S2). Step S2 corresponds to the detection step in the claims. When more than one set of coordinate information indicating a touch operation has not been inputted (step S2/NO), the information processing device 50 determines a controller displayed at the position of the coordinate indicated by the inputted coordinate information (step S3). When the information processing device 50 determines that a controller is present, it determines whether or not an operation corresponding to the controller has been detected (step S4). For example, when the controller is a slider bar 103 and a slider 105, the information processing device 50 determines whether or not an operation of moving the slider 105 has been detected. When the controller is a switch or a button, the information processing device 50 determines whether or not coordinates included in the display position of the switch or button have been continuously detected for a certain period of time.

When an operation corresponding to the controller has been detected (step S4), the information processing device 50 issues an instruction to execute the process corresponding to the detected operation on the target electrical component 80 (step S5). For example, when the target electrical component 80 on the first menu screen 100 is an air conditioner and the controller has been determined to be the slider and slider base for setting the temperature in step S4, the information processing device 50 changes the temperature setting of the air conditioner according to the extent of the operation received from the user by operating the slider.

When more than one set of coordinate information indicating a touch operation has been inputted from the touch panel 40 (step S2/YES), the information processing device 50 causes the touch panel 40 to display a second menu screen 200 (step S6). Step S6 corresponds to the display step in the claims. The information processing device 50 displays contact points 203A, 203B at the coordinates of the touch panel 40 indicated by the inputted coordinate information, and displays a circle graphic 201 with the two contact points 203A, 203B forming the diameter. The information processing device 50 displays the pointer 207 at a position in contact with the circle graphic 201 in a direction parallel to the direction orthogonal to the virtual line segment 221 connecting contact point 203A and the contact point 203B, and displays the semicircular range graphic 205 to the outside of the circle graphic 201.

Next, the information processing device 50 sets a virtual line segment 221 connecting the two contact points 203A, 203B (step S7), and calculates the length and rotation angle θ of the virtual line segment 221. The rotation angle θ can be, for example, the angle formed by the virtual line segment 221 and the horizontal rightward direction on the second menu screen 200.

Next, the information processing device 50 determines whether or not a change in the coordinates indicated by the coordinate information inputted from the touch panel 40 has been detected (step S10). If the information processing device 50 cannot detect a change in the coordinates (step S8/NO), the process returns to step S8. The information processing device 50 may also advance to step S15 and determine whether or not a certain period of time has elapsed since the input of coordinate information in step S1.

When the information processing device 50 has detected a change in the coordinates (step S8/YES), the length and rotation angle θ of the virtual line segment 221 connecting the two contact points 203A, 203B corresponding to the changed coordinates are calculated (step S9). The information processing device 50 determines whether or not there has been a change in the calculated virtual line segment 221.

When it has been determined that there has been a change in the length of the virtual line segment 221 (step S10/length), the information processing device 50 calculates the air flow from the air conditioner to be changed based on the difference between the first length X1 of the virtual line segment 221 before the change in coordinates was detected and the second length X2 of the virtual line segment 221 after the change in the coordinates was detected (step S11). The information processing device 50 increases the air flow from the air conditioner when the second length X2 of the virtual line segment 221 is longer than the first length X1 before the change. The information processing device 50 decreases the air flow from the air conditioner when the second length X2 of the virtual line segment 221 is shorter than the first length X1 before the change. Steps S9 to S11 correspond to the detection step. The information processing device 50 calculates the air flow in the change instruction for the air conditioner based on the difference in the length of virtual line segment 221 before and after the change. When the air flow in the change instruction for the air conditioner has been calculated, the information processing device 50 outputs a change instruction for the calculated air flow to the air conditioner (step S12). Step S12 corresponds to the instruction issuing step in the claims.

When it has been determined that there has been a change in the rotation angle θ of the virtual line segment 221 (step S10/rotation), the information processing device 50 calculates the temperature setting for the air conditioner to be changed based on the difference between the first rotation angle θ1 of the virtual line segment 221 before the change in coordinates was detected and the second rotation angle θ2 of the virtual line segment 221 after the change in coordinates was detected (step S13). Steps S9, S10 and S13 correspond to the detection step in the claims. When the second rotation angle θ2 of the virtual line segment 221 is larger than the first rotation angle θ1 before the coordinates were changed, the information processing device 50 lowers the temperature setting of the air conditioner. When the second rotation angle θ2 of the virtual line segment 221 is smaller than the first rotation angle θ1 before the coordinates were changed, the information processing device 50 raises the temperature setting of the air conditioner. The information processing device 50 calculates the temperature setting in the change instruction for the air conditioner based on the difference in the rotation angle θ of the virtual line segment 221 before and after the change. When the information processing device 50 has calculated the set temperature, it outputs a change instruction for the calculated temperature setting to the air conditioner (step S14). Step S14 corresponds to the instruction issuing step.

Next, the information processing device 50 determines whether or not a certain period of time has elapsed since the instruction was outputted to the air conditioner (step S15). When a certain period of time has not elapsed (step S15), the information processing device 50 waits until the certain period of time has elapsed (step S15). When the certain period of time has not elapsed (step S15/YES), the information processing device 50 outputs a predetermined sound from the audio output unit 30 to perform a notification operation (step S16). Afterward, the information processing device 50 determines whether or not input of coordinate information from the touch panel 40 has stopped (step S17). In other words, it determines whether or not the passenger has released his or her finger from the touch panel 40. When the input of coordinate information from the touch panel 40 is continued (step S17/NO), the information processing device 50 proceeds to the determination of step S8. When the input of coordinate information from the touch panel 40 has stopped (step S17/YES), the information processing device 50 ends the processing flow.

In step S10 of the flowchart shown in FIG. 12, the information processing device 50 either detects a change in the length of the virtual line segment or rotation of the virtual line segment. However, it may detect both a change in the length of the virtual line segment and rotation of the virtual line segment. When both a change in the length of the virtual line segment and rotation of the virtual line segment are detected, the information processing device 50 changes the air flow from the air conditioner based on the detected change in the length of the virtual line segment and changes the temperature setting of the air conditioner based on the amount by which the detected virtual line segment was rotated.

The information processing device in the embodiment described above includes an operation detecting unit 61, a display control unit 63, and an execution instruction issuing unit 65. The operation detecting unit 61 detects a first touch operation and a second touch operation different from the first touch operation on the touch panel 40 based on coordinate information indicating the touched positions inputted from the touch panel 40. When the first menu screen 100 is being displayed on the touch panel 40 and a first touch operation is detected by the operation detecting unit, the display control unit 63 changes the display on the touch panel 40 from the first menu screen 100 to a second menu screen 200. When the operation detecting unit 61 detects a second touch operation on the touch panel 40 on which a second menu screen 200 is being displayed, the execution instruction issuing unit 65 issues an instruction to execute the process associated with the detected second touch operation. The operation detecting unit 61 determines that a first touch operation has been detected when a plurality of touch positions are detected based on the coordinate information.

The operation detecting unit 61 also calculates the length of the virtual line segment 221 connecting the plurality of touch positions detected as a first touch operation, or the rotation angle of the virtual line segment 221 with respect to the reference direction. When coordinate information has been inputted from the touch panel 40, that is, the touch panel 40 on which a second screen is displayed, the operation detecting unit 61 determines whether or not a change has occurred in the length or rotation angle of the virtual line segment 221 based on the inputted coordinate information, and determines that the second touch operation has been detected when it is determined that the length or rotation angle of the virtual line segment 221 has changed. The execution instruction issuing unit 65 issues an instruction to execute the process associated with the change in the length of the virtual line segment 221 or the rotation direction of the virtual line segment 221. As a result, a passenger can issue instructions to execute the processes associated with each of these operations by performing an intuitive operation of narrowing, widening, or rotating a space between fingers touching the touch panel 40 as a first touch operation. In this way, the operability of operations performed using a touch panel can be improved, and user convenience can be improved.

The display control unit 63 displays a range graphic 205 indicating the range in which settings for the target electrical component 80 can be changed, and a pointer 207 indicating a position on the range graphic 205 based on a plurality of touch positions detected as a first touch operation. The display control unit 63 detects the amount of change in the rotation angle of the virtual line segment 221 based on the coordinate information inputted from the touch panel 40, and makes the position on the range graphic 205 pointed to by the pointer 207 correspond to the detected amount of change. As a result, the passenger can visually comprehend the extent of an operation when a plurality of fingers are rotated at the same time while keeping the space between the fingers touching the touch panel 40 constant.

The display control unit 63 displays a circle graphic 201 whose diameter is formed by the two touched positions detected as a first touch operation. The display control unit 63 detects the change in the length of the virtual line segment 221 based on the coordinate information inputted from the touch panel 40, and changes the diameter of the circle graphic 201 based on the detected change in the length. As a result, the passenger can comprehend the extent of the operation based on the size of the diameter of the circle graphic 201 displayed on the touch panel 40.

The embodiment described above is just an example of how to embody the present invention, and various modifications and applications are possible without departing from the scope and spirit of the present invention. For example, in the embodiment described above, the first touch operation and the second touch operation are performed with two fingers. However, a first touch operation and a second touch operation may also be performed with three fingers. When a thumb, index finger, and middle finger are used to perform a first touch operation and a second touch operation, the information processing device 50 may select the two fingers with the greatest space between them as the control fingers, set the contact points where these two fingers come into contact with the touch panel 40 as contact point 203A and contact point 203B, and set the line segment connecting contact point 203A and contact point 203B as the virtual line segment 221.

Moreover, an operation in which the space between the two fingers is widened may be associated with the operation for raising the temperature setting of the air conditioner, and an operation in which the space between the two fingers is narrowed may be associated with the operation for lowering the temperature setting of the air conditioner. Furthermore, an operation in which the two fingers are rotated counterclockwise around the center of rotation while keeping the space between the two fingers constant may be associated with the operation for decreasing the air flow of the air conditioner, and an operation in which the two fingers are rotated clockwise around the center of rotation while keeping the space between the two fingers constant may be associated with the operation for increasing the air flow of the air conditioner.

In the embodiments described above, the control target of the second menu screen 200 is an air conditioner. However, the electrical component 80 controlled by the second menu screen 200 is not limited to an air conditioner. It can be audio equipment, an electric seat, or a navigation system. The traveling mode of the vehicle can also be changed by operating a second menu screen 200.

Figure 13:
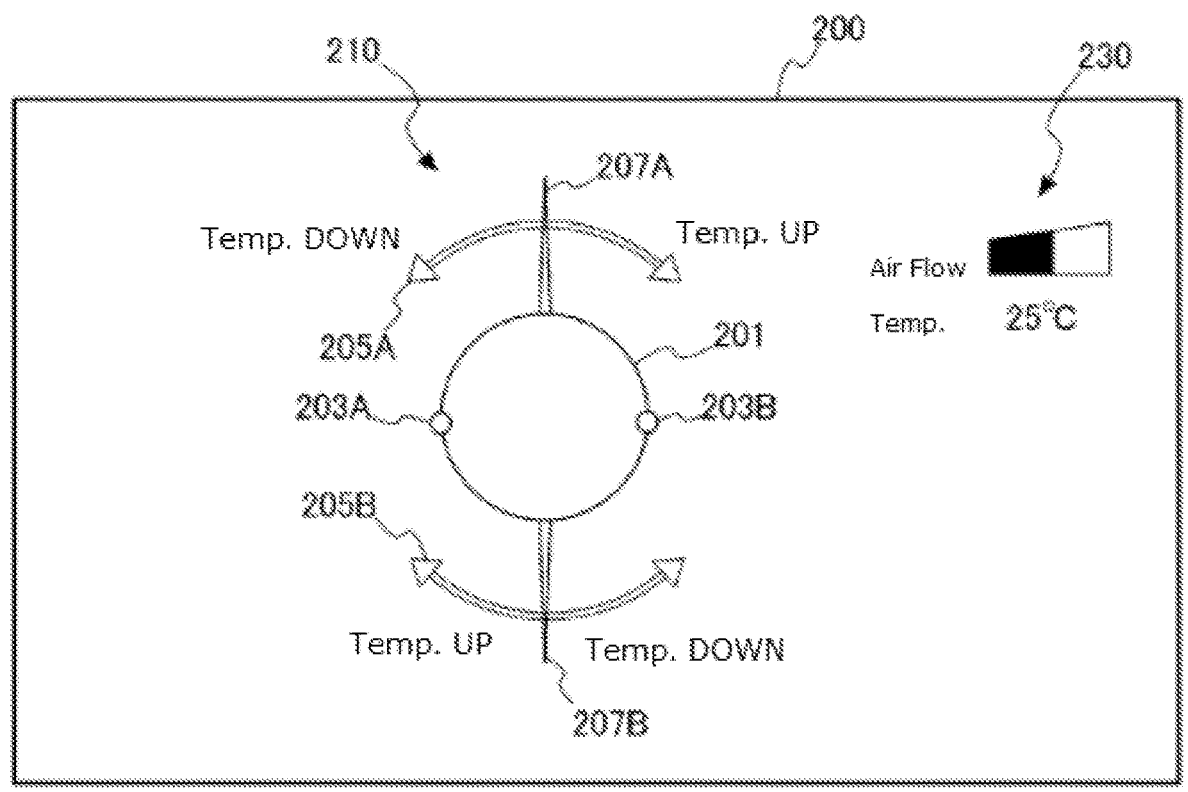
FIG. 13 is a diagram showing another example of the second menu screen.

Further, the second menu screen 200 is not limited to the display screen shown in FIG. 4. For example, arrows pointing in the up, down, left, and right directions may be displayed on the second menu screen 200, and the setting of a control item changed when a finger is moved in the direction indicated by an arrow. Also, a plurality of range graphics 205 and pointers 207 may be displayed. A circle graphic 201, range graphics 205A, 205B, and pointers 207A, 207B are displayed on the second menu screen 200 shown in FIG. 13. Range graphic 205A is displayed above the circle graphic 201 at a position separated from the circle graphic 201 by a certain distance. The range of the range graphic 205A on the right side of the second menu screen 200 indicates the range for increasing the temperature, and the range of the range graphic 205A on the left side of the second menu screen 200 indicates the range for decreasing the temperature. Range graphic 205B is displayed above the circle graphic 201 at a position separated from the circle graphic 201 by a certain distance. The range of the range graphic 205B on the right side of the second menu screen 200 indicates the range for decreasing the temperature, and the range of the range graphic 205B on the left side of the second menu screen 200 indicates the range for increasing the temperature. One end of the pointer 207A touches the circle graphic 201. When the circle graphic 201 is rotated by an operation performed by the passenger, the pointer 207A rotates with the rotation of the circle graphic 201. The position on the range graphic 205A pointed to by the pointer 207 is also changed by rotating the pointer 207A. One end of the pointer 207B touches the circle graphic 201. When the circle graphic 201 is rotated by an operation performed by the passenger, the pointer 207B rotates with the rotation of the circle graphic 201. The position on the range graphic 205B pointed to by the pointer 207 is also changed by rotating the pointer 207B. Because pointer 207A and pointer 207B both rotate with the rotation of the circle graphic 201, the amount of change in the position on the range graphic 205A pointed to by pointer 207A before and after rotation is the same as the amount of change in the position on the range graphic 205B pointed to by pointer 207B before and after rotation.

The functional blocks of the information processing device 50 in FIG. 1 show functions of the information processing device 50 classified according to the primary processes, but these processes may be divided further into more blocks. The processing for each block may be executed by a single hardware device or by a plurality of hardware devices. The processing for each block may also be executed by a single software program or by a plurality of software programs.

In order to make the processing performed by the information processing device 50 easier to understand, the processing units in the flowchart shown in FIG. 12 were divided according to primary processes. However, in the present invention, there are no particular restrictions on the method used to divide processing units and the names assigned to them. The processing performed by the information processing device 50 can be further divided into even more processing units, and each processing unit can also be divided to include more processing. In addition, the order in which the processing is performed is not limited to the order shown in the flowchart.

When the program of the present invention is realized by a computer, the program executed by the computer can be configured in the form of a recording medium or a transmission medium for transmitting the program. The recording medium can be a magnetic or optical recording medium or a semiconductor memory device. Specifically, the recording medium can be a flexible disk, an HDD (hard disk drive), a CD-ROM (compact disk read-only memory) disk, a DVD disc, a Blu-ray® disc, or a magneto-optical disk. The recording medium can also be a portable recording medium such as a flash memory or a card-type recording medium, or a fixed recording medium. In addition, the recording medium can be a non-volatile storage device such as RAM, ROM, or HDD serving as an internal storage device in the display device.

KEY TO THE DRAWINGS

1: System
10: Camera
20: Control panel
30: Audio output unit
40: Touch panel
43: Touch sensor
50: Information processing device
51: I/O interface
53: Memory
55: Control program
60: Processor
61: Operation detecting unit
65: Execution instruction issuing unit
80, 80A, 80B, 80C: Electrical components
100: First menu screen
101A: Set temperature
101B: Air flow
103, 103A, 103B: Slider bar
105, 105A, 105B: Slider
107: Power button
200: Second menu screen
201: Circle graphic
203A: Contact point
203B: Contact point
205: Range graphic
207: Pointer
210: Control image
230: Associated information

What is claimed is:

1. An information processing device connected to a touch panel comprising:
   a processor;
   a non-volatile storage device storing a control program; and
   a temporary memory used by the processor for temporarily storing processing data,
   wherein the processor, by executing the control program,
   detects a first touch operation and a second touch operation on the touch panel based on coordinate information indicating a touched position inputted from the touch panel, wherein in the first touch operation, two fingers of a user contact on the touch panel, and in the second touch operation different from the first touch operation, the two fingers of the user touched on the touch panel move while keeping the two fingers on a touch panel,
   displays a first screen in which control items including a first control item and a second control item and controllers including buttons, switches, or sliders to control the control items by one finger of the user are displayed on the touch panel after a power is turned on,
   changes a display from the first screen to a second screen when the first touch operation has been detected, wherein the second screen displays a single circle graphic to control same functions of the first and second control items displayed on the first screen, and a first operation amount of the first control item and a second operation amount of the second control item are controlled by changing a size of a diameter of the circle graphic and rotating a pointer of the circle graphic in response to subsequent movement of the two fingers, and
   issues an instruction to execute a process associated with the detected second touch operation when the second touch operation has been detected on the touch panel displaying the second screen,
   wherein the processor determines that the first touch operation has been detected when two contact points on the touch panel displaying the first screen have been detected based on the coordinate information, and based on the coordinate information, calculates a length of a virtual line segment connecting the two contact points on the touch panel, and a rotation angle of the virtual line segment with respect to a reference direction, and
   determines that the second touch operation has been detected when it has been determined that a change in the length or the rotation angle of the virtual line segment has occurred, and
   wherein the size of the diameter of the circular graphic is changed with respect to the length of the virtual line segment and the processor issues an instruction to execute a process associated with the first operation amount indicating the diameter which control the same function of the first control item displayed on the first screen, and
   a position of the pointer is changed with respect to the rotation angle and the processor issues an instruction to execute a process associated with the second operation amount indicating the position which control the same function of the second control item displayed on the first screen.

2. The information processing device according to claim 1, wherein the processor displays a range graphic showing a possible moving range of the pointer indicating the second operation amount in the vicinity of the circumference of the circle graphic on the second screen.

3. A non-transitory computer-readable recording medium for a system including an information processing device and a touch panel, wherein the information processing device has a processor, a non-volatile storage device storing a control program, and a temporary memory used by the processor for temporarily storing processing data, the system including the information processing device comprising:

detecting a first touch operation and a second touch operation on the touch panel based on coordinate information indicating a touched position inputted from the touch panel, wherein in the first touch operation, contacting two fingers of a user on the touch panel, and in the second touch operation different from the first touch operation, moving the two fingers of the user touched on the touch panel while keeping the two fingers on a touch panel, displaying a first screen in which control items including a first control item and a second control item and controllers including buttons, switches, or sliders to control the control items by one finger of the user are displayed on the touch panel after a power is turned on, changing a display on the touch panel from the first screen to a second screen when the first touch operation has been detected in the detection step, wherein the second screen displays a single circle graphic to control same functions of the first and second control items displayed on the first screen, and a first operation amount of the first control item and a second operation amount of the second control item are controlled by changing a size of a diameter of the circle graphic and rotating a pointer of the circle graphic in response to subsequent movement of the two fingers, issuing an instruction to execute a process associated with the detected second touch operation when the second touch operation has been detected in the detection step on the touch panel displaying the second screen, determining that the first touch operation has been detected when two contact points on the touch panel displaying the first screen have been detected based on the coordinate information, and based on the coordinate information, calculating a length of a virtual line segment connecting two contact points on the touch panel, and a rotation angle of the virtual line segment with respect to a reference direction, determining that the second touch operation has been detected when it has been determined that a change in the length or the rotation angle of the virtual line segment has occurred, and changing the size of the diameter of the circular graphic with respect to the length of the virtual line segment and issuing an instruction to execute a process associated with the first operation amount indicating the diameter which control the same function of the first control item displayed on the first screen, and changing a position of the pointer with respect to the rotation angle and issuing an instruction to execute a process associated with the second operation amount indicating the position which control the same function of the second control item displayed on the first screen.

\* \* \* \* \*